United States Patent
Mounirou et al.

(10) Patent No.: US 11,422,871 B1
(45) Date of Patent: Aug. 23, 2022

(54) EVENT ARCHIVING AND REPLAY

(71) Applicant: Amazon Technologies, Inc., Seattle, WA (US)

(72) Inventors: Mohamed Marzouk Adedoyin Mounirou, Vancouver (CA); Neha Gupta, Vancouver (CA); Jakub Mateusz Narloch, Vancouver (CA); Tristan Calderbank, Vancouver (CA); Kunal Chopra, Vancouver (CA); Juan Jose Tam-Huang, Vancouver (CA); Siva Swaroop Palli, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 17/038,809

(22) Filed: Sep. 30, 2020

(51) Int. Cl.
| | |
|---|---|
| *G06F 9/54* | (2006.01) |
| *G06F 16/11* | (2019.01) |
| *G06F 21/60* | (2013.01) |
| *G06F 16/28* | (2019.01) |
| *G06Q 30/00* | (2012.01) |
| *G06Q 10/10* | (2012.01) |
| *G06Q 10/06* | (2012.01) |
| *G06Q 10/00* | (2012.01) |

(52) U.S. Cl.
CPC ............ *G06F 9/542* (2013.01); *G06F 16/113* (2019.01); *G06F 16/285* (2019.01); *G06F 21/602* (2013.01); *G06Q 10/06395* (2013.01); *G06Q 10/101* (2013.01); *G06Q 10/20* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 6,810,199 B1 * | 10/2004 | Horiguchi | H04L 12/40117 386/292 |
| 9,256,467 B1 | 2/2016 | Singh et al. | |
| 2018/0027006 A1 * | 1/2018 | Zimmermann | H04L 63/0227 726/11 |

* cited by examiner

*Primary Examiner* — Craig C Dorais
(74) *Attorney, Agent, or Firm* — Davis Wright Tremaine LLP

(57) ABSTRACT

Systems and methods are described herein for a service that backs-up and stores events received at an event bus, in order to replay those backed-up events at a later time. In one example, a request to replay an event processed by an event bus may be received, for example, by a service. The event bus may process events by directing individual events to a target to perform an operation on the data. Individual event may include data and metadata indicating attributes of the data. A data object, corresponding to the event may be obtained from an event archive, which stores multiple events organized into a number of data objects according to attributes of the events. An event may be extracted from the data object and sent to the event bus to be reprocessed by the event bus and directed to the target to perform the operation on the data.

22 Claims, 9 Drawing Sheets

EVENT ARCHIVING AND REPLAY

BACKGROUND

Developers are increasingly embracing event-driven architecture in building applications and computing services, as event-driven architectures enable them to decouple different components of the application or service, making the end product more scalable, reliable, cost-effective, and simple to operate. Event-driven applications may be configured to perform an action in response to an occurrence of an event. Events may be received from one or more sources and routed to targets to process the events, using pre-defined rules. After the event has been processed, it is often discarded by the application, to reduce the amount of resources used to support the event driven application. This introduces a durability problem, where developers may encounter errors in software code, but then have no way to re-process discarded events. Often developers also need to extend event-driven applications, for example, adding functionality to automatically assign a priority rating to a support ticket when it is created, but this can be difficult to apply to existing support tickets, because historic events have already been discarded by their application.

BRIEF DESCRIPTION OF THE DRAWINGS

Various techniques will be described with reference to the drawings, in which.

DETAILED DESCRIPTION

Figure 1:
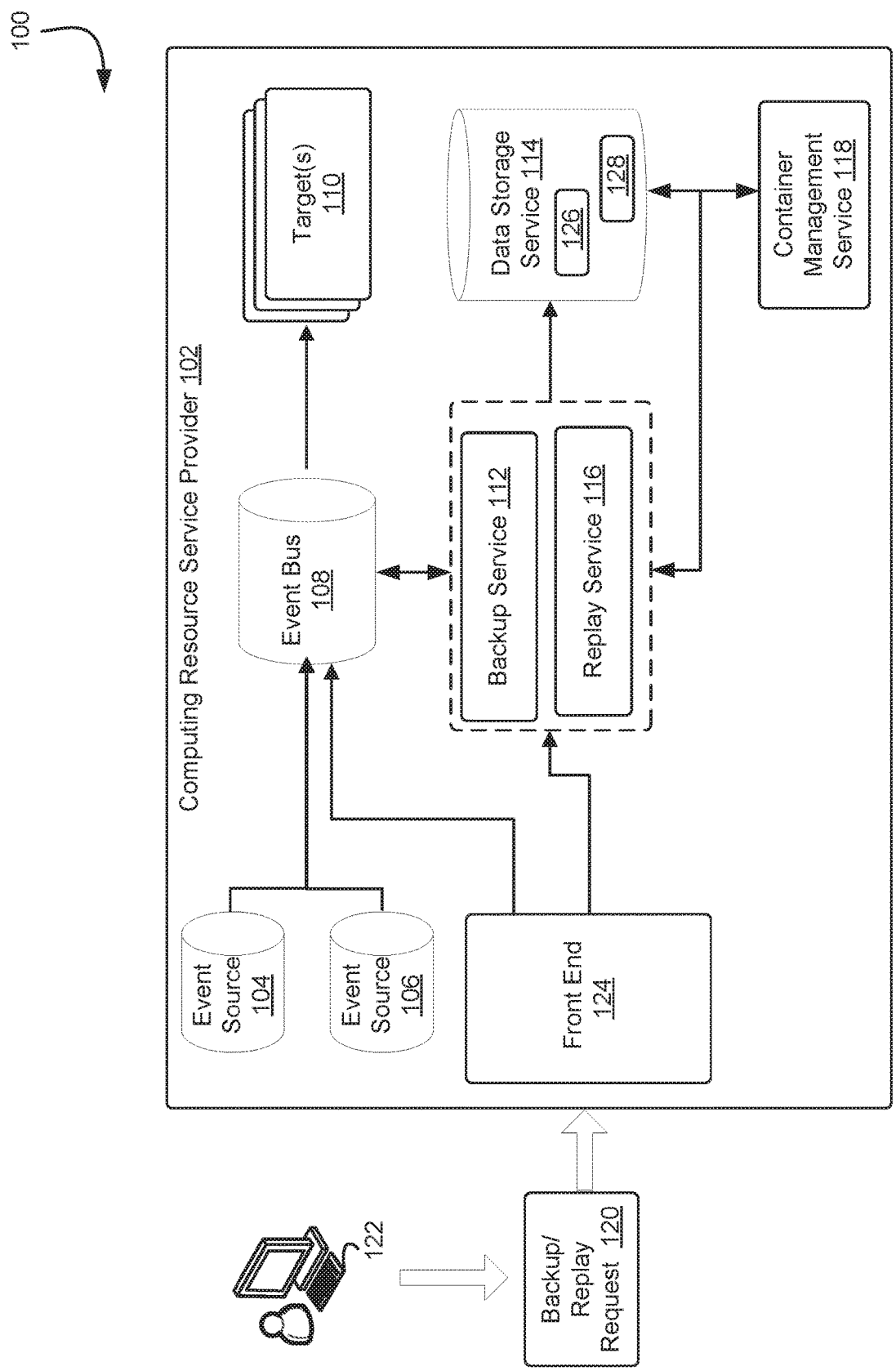
FIG. 1 illustrates an example event backup service and an event replay service interacting with an event bus, such as provided by a computing resource service provider, according to at least one embodiment.

Systems and methods are described herein for archiving and replaying events that are received at an event bus, such as provided by a computer resource service provider. In one example, an event may include some type of data from a source, such as an application or service, which when received by an event bus or event-based compute service, is routed to a target, which may include a subsequent process, application, etc., for performing some action in response to the occurrence of the event. Using the described backup and replay service, the event may be captured and stored in an archival data store, in addition to be routed to a designated target. In some cases, various rules may be configurable to capture and archive certain events from a stream of events received at the event bus. The events may be grouped together according to one or more attributes of the individual events, optionally compressed and encrypted, and stored as data objects in a data storage, such as may also be provided by the computing resource service provider. In one example, events may be grouped according to a time stamp associated with each of the events, such that the resulting group contains events having a timestamp within a time period. The time period may be configurable, such as based on types of data, size of data, etc., to facilitate efficient access to the events at a later time.

A user may subsequently request that one or more archived events be replayed through the event backup and replay service. The user may specify which events to replay by specifying an event identifier (ID), event time period, etc. Upon receiving the replay request, a software container may be instantiated to obtain data objects corresponding to the requested events from the archive data storage. The software container may identify the data object or objects for retrieval via the data object partition ID, the data in the event, or metadata associated with the event. The software container may then de-encrypt and decompress the data object, and extract the requested event or events. The software container may queue and send events back to the event bus or event based compute service, to be reprocessed or replayed, whereby the event is directed to an appropriate target for further processing. In some cases, the rate at which events are replayed back through the event bus may be controlled or throttled, such as, for example, based on a user or service limit, or a requested limit, such as to slow the replay of events for more thorough analysis, etc. In some cases, individual software containers may be instantiated for each event.

In some cases, events from the event bus may be received and ingested by an ingestion service. Pre-processing may be performed on the received events prior to the events being received by the ingestion service. The pre-processing may include assigning a partition ID to individual events, where the partition may indicate an event time. The ingestion service may use the event time indicated in the partition ID associated with each event to partition and batch the events. Post processing may be performed on the batches of events, which may include compressing and encrypting the events, and the subsequent archival data object generated by the post processor may be stored in archival data storage. In some cases, the archival data storage may include a number of logical data containers, and the archival data objects may be stored across the number of the logical data containers.

In some cases, the described systems and methods enable developers and users to customize which events are archived, and then access those archived in the future, to reprocess them, such as through an event bus. This may be particularly useful and provide benefits during development and testing, when recovering from production outages, when doing AB testing of algorithms and campaigns, when giving demos to customers or internal stakeholders, backfills (introduce new capability or new target to a rule—replay the events) and so on.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) reducing computing resource needed to test and revise software applications, and 2) reducing network bandwidth usage needed to test and revise software applications, among a number of other benefits and advantages, as will be described throughout this disclosure.

FIG. 1 illustrates an example environment 100 in which an event backup service 112 and an event replay service 116 are provided by a computing resource service provider 102. A client 122 may interact with the computing resource service provider 102 via a front end 124 over one or more networks to manage an event-driven service or event bus 108, via a backup service 112 and a replay service 116, as will be described in greater detail below. The client 122 may interface with the backup service 112 to configure which events received at the event bus 108 are to be stored for later use. The client 122 may similarly interface with the replay service 116 to configure and initiate reprocessing of saved events though the event bus 108.

Client 122 may refer to a client computer system or computing device connected to a server (e.g., computing resource service provider) over a network. In some cases, client 122 refers to a user or operator of a client computer system, and may be an employee of an organization that utilizes a computing resource service provider 102 to host an event bus 108 and event backup service 112 and an event replay service 116. Client 122 may submit a request for access to various computing resources (e.g., services or computing resources thereof) of computing resource service provider 102. The request, in some examples, is a web service application programming interface request (also referred to simply as a web service request), may be received by a front end 124.

In the example illustrated, client 122 may submit a backup/replay request 120 to the front end 124, to configure archiving certain events processed by the event bus 108 and to configure and initiate replaying of archived events by the event bus 108 via backup service 112 and replay service 116. In some cases, the request 120 may specify a backup or archive criteria for selecting which events will be saved and stored by the backup service 112. In some cases, the criteria may include a time or time window of events to backup, one or more sources that are associated with events to be backed up, certain key words, actions, results, etc. that may be indicated by various events to be backed up, etc. In other cases, the request 120 may include identification of certain events to replay or re-process through the event bus 108, such as to test changes to an event driven application, and for various other reasons. The request 120 may additionally or alternatively indicate a replay speed or other parameters associated with replaying one or more events, as will be described in greater detail below.

The front end 124 may be a system including a set of web servers (e.g., a single web server or a set of web servers which may be managed by a load balancer) provided by the computing resource service provider 102. Web servers of the front end 124 may be configured to receive various requests and to process them according to one or more policies associated with the service. In at least one embodiment, client 122 uses client software that is configured to establish a client-server relationship with a service of a computing resource service provider 102. A client 122 may connect to a service via front end 124, which receives requests from clients and routes them to backend services. Front end 124 may interface with an event bus 108, an event backup service 112, and/or an event replay service 116, offered by a computing resource service provider 102 to its customers. In at least one embodiment, client 122 interacts with a GUI to configure event backup, configure event replay, or initiate an event replay, and client-side software translates the GUI setup to a web service API request which is transmitted from the client computer system 122 to front end 124 via a network. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described in FIG. 9. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide an event bus 108, which may be part of an event-based service. In some cases, the event bus may be a service provided by the computing resource service provider 102. In yet some cases, event bus 108 may be a serverless application, such that it utilizes computing resources when events are published to it and does not utilize compute resources when it is not performing one or more functions. Serverless, as used herein, may refer to a service, application, or function that utilizes virtual computing resources without the use of dedicated servers or other hardware components. A serverless application may not require more traditional infrastructure management, including server or cluster provisioning, patching, operating system maintenance, and capacity provisioning. Serverless, as used herein, may also refer to an event-driven architecture, which uses events to trigger and communicate between decoupled services, and may be particularly beneficial when used in applications build with micro services.

The event bus 108 may receive a number of events, such as a stream of events, from various configurable sources 104, 106. As used herein, an event may be a change in state, or an update, of some piece of information. Events can either carry the state (e.g., the item purchased, its price, and a delivery address) or events can be identifiers (a notification that an order was shipped). Events may be generated by any of a variety of sources, and may be used to trigger other actions, processing, etc., by services or applications, referred to herein as targets. In some cases, an event may take any of a variety of forms, including a JSON object, and the like.

The one or more sources 104, 106 may include one or more physical devices, such as sensors, Internet of things (IoT) devices, mobile devices, or other computing devices, services, or other entities that send events to the event bus 108. In yet some cases, one or more sources 104, 106 may include other computing services or applications, either provided by the computing resource service provider 102, or other services not provided by the computing resource service provider 102, various applications including custom applications, software as a service applications, etc., network interfaces such that route events from physical devices to the event bus 108, data storage locations, such as provided by data storage service 114 or provided by other data storage services or devices, and so on. The event bus 108 may receive the stream of events and route them, according to various rules, to one or more targets 110 for further processing. Likewise, the targets 110 may include one or more physical or virtual devices, locations, services, etc., such as notification services, applications, compute functions or workflows (e.g., other serverless or event-driven services), storage locations, and so on. It should be appreciated that the above descriptions of sources 104, 106, and targets 110 are only given by way of example, and that various other end points, including other computing infrastructure, are contemplated herein.

The event bus 108 may implement a set of rules for directing certain events to certain targets 110. These rules may be fully configurable by client 122, and may determine where to send an event for additional processing based on a number of different factors, including the source of an event, data contained within the event, metadata associated with the event, and so on. Client 122 may configure the event bus 108, and/or sources 104, 106 and targets 110, for a number of different use cases, such as to trigger automated workflows responsive to changes in status of customer support tickets for an application, trigger messages to be sent across one or more channels responsive to security events, and to access, process, and/or send operational data between systems, such as to update operational loads on a system to engineering team. In yet other cases, a client 122 can configure the event bus 108, sources 104, 106, and/or targets 110 to perform auto scaling of computing resources responsive to load on one or more selected applications, to automate directory registration processes for certain applications, and to trigger workflows based on changes in customer data, as a few examples.

In addition to interfacing with the event bus 108, using the systems described herein, a client 122 may also configure what events published to the event bus 108 are stored for backup through an event backup service 112, such as to be used to test new rules or processes in the future. Backup service 112 may be a process executed by one or more computing devices, either physical, virtual or a combination thereof, provided by the computing resource service provider 102 for backing up events to the data storage service 114. The backup service 112 may maintain or access a set of rules that specify which events are to be saved, such as by data storage service 114. These rules may be configurable by client 122, and may specify with varying granularity and via various metrics which events are to be saved or archived. For example, a client 122 configure a number of rules to only store events that correspond to security changes or events with respect to a certain account or application.

The backup service 112 may, in some aspects, maintain and update rules forming an event backup criteria used by the event bus 108 to direct certain events to the backup service 112 for storage. In some cases, the backup service 112 may send these rules to the event bus 108 directly, such as periodically or upon a change to a rule. In other cases, the event backup service 112 may store send updates to the rules maintained in data storage, such as provided by the data storage service 114. In this case, the event bus 108 may access the rules from the data storage service 114 and implement the rules when new events are published at the event bus 108. In yet other cases, the data storage service 114 and/or an event-based function may push the updated rules to the event bus 108 for enforcement, such that the event bus would maintain an up to date copy of the rules. In yet other cases, the event bus 108 may pull the rules from the backup service 112.

Upon an event being published at the event bus 108 that satisfies a backup criteria, the event may be sent to or pulled by the backup service 112. The backup service 112 may process the event, such as by formatting the event, grouping it with other events, compressing the resulting data and encrypting it, to generate an archive data object that can be efficiently stored by the data storage service 114. The data storage service 114 may then store and maintain the archive data object. A more detailed example of the various components and process performed by the backup service will be described in greater detail below in reference to FIGS. 2 and 3.

In some examples, the computing resource service provider 102 may provide data storage through a data storage service 114 to store and manage large volumes of data. Data storage service 114 may be an on-demand data storage service, such as an object-based data storage service, and may be configured to store events and rules for the event bus 108. In some cases, the data storage service 114 may be a service provided by a computing resource service provider 102. The data storage service 114 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The data stored in the data storage service 114 may be organized into data objects, in one or more logical data containers 126, 128. The data objects may have arbitrary sizes and may, in some instances, have constraints on size. Thus, the data storage service 114 may store numerous data objects of varying sizes. The data storage service 114 may operate as a key value store that associates data objects with identifiers of the data objects which may be used by the client 122 to retrieve or perform other operations in connection with the data objects stored by the data storage service 114. Access to the object-based data storage service 114 may be through application programming interface (API) calls to the service or via an interface, such as a graphical user interface (GUI).

The data storage service 114 may provide isolated containers or partitions, referred to herein as logical data containers 126, 128, for storing data. The data stored in the data storage service 114 may be organized into data objects or blocks within a logical data container. In some cases, the data storage service 114 may operate as a key value store that associates data objects with identifiers of the data objects which may be used by the client 122 to retrieve or perform other operations in connection with the data objects stored by the data storage service 114. Access to the data storage service 114 may be through application programming interface (API) calls to the service, for example from either directly from client 122, or via the computing resource service provider 102. It should be appreciated that the data storage service 114 may additionally or alternatively provide non-object based data storage, such as block data storage, table-oriented data storage, relational databases, file-based storage, and the like. However, for consistency and ease of reference, the described techniques will primarily be described in relation to object-based data storage systems.

In some cases, access to files or data objects that are stored by the data storage service 114 may be secured by one or more policies stored and maintained by the data storage service 114 itself, and/or an identity and access management (IAM) system that interacts with the data storage service 114, such as provided by a computing resource service provider 102. Some or all other attributes, such as prefix, logical data container identifier, storage class, creation date, etc. may be stored in a given object's metadata. In some cases, file or object permissions, folder permissions, and attributes may be stored and managed by the data storage service 114 and/or the computing resource service provider 102, as object metadata in the data storage service 114. In some cases, if the permissions are changed on a file or data object, the data storage service 114 and/or the computing resource service provider 102 may modify the metadata of the associated objects that are stored in a logical data container 126, 128 to reflect the changes.

In some cases, the data storage service 114 may maintain and manage a permissions policy for one or more logical data containers 126, 128, which may specify what actors, devices, and/or credentials are required to access certain data objects stored in the one or more logical data containers 126, 128. In yet some aspects, the data storage service 114 may interface with an IAM system or service, which may manage one or more permissions policies.

The data storage service 114 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

Upon receiving a replay request 120, the front end 124 may direct the request to the replay service 116. The replay service may then identify which data objects correspond to the events indicated in the request 120 for reprocessing by the event bus and obtain those data objects from the data storage service 114. The replay service 116 may then de-encrypt and decompress the data objects, as needed, and extract the indicated events from the data object. The replay service 116 may then publish the event or events on the event bus 108, so that the event or events may be reprocessed by the event bus 108 and sent to an appropriate target 110.

In some aspects, the replay service 116 may be a service of the computing resource service provider 102 that is configured to replay stored events back to the event bus 108. In embodiments, the replay service 116 may interact with a container management service 118, or other compute resource service, such as a virtual instance service and the like, to facilitate processing the data objects and publishing the extracted events on the event bus 108. In some cases, one or more software containers may be instantiated by the container management service 118 at the direction of the replay service to facilitate obtaining, processing, and publishing events to the event bus 108 for reprocessing or replaying. In some cases, a separate software container may be instantiated to process each event to be replayed by the replay service 116. This may enable faster processing of the event replay and/or may provide for enhanced data security in the replay process. In other examples, virtual machine instances or other configurations of computing resources may similarly be utilized by the replay service 116 to obtain, process, and publish event to the event bus 108.

In some cases, the replay service 116 may control one or more aspects of replaying events through the event bus 108, such as by controlling or throttling a rate by which events are published to the event bus 108. In some cases, the limit may be a client limit with the computing resource service provider 102, such that the replay service 116 may enforce the already established limit. In other cases, the replay service 116 may establish a throttle or rate limit on its own, such as to manage resource utilization for multiple clients, and/or may enforce a client specified rate. In some aspects, the client 122 may provide a rate to slow down replay of certain events, to facilitate more in depth analytics on the processing of the events, such as to identify issues with new rules being enforced by the event bus 108. A more detailed example of the various components and process performed by the replay service 116 will be described in greater detail below in reference to FIGS. 4-8.

In some examples, container management service 118 may include one or more aspects of the container management service described in U.S. Pat. No. 9,256,467, filed on Nov. 11, 2014, entitled "SYSTEM FOR MANAGING AND SCHEDULING CONTAINERS," the contents of which are herein incorporated by reference in its entirety. In some examples, a request 120 to launch one or more tasks, defined by one or multiple task definitions, may be received at a container management service 118. Each task definition is, in an embodiment, a file specifying a set of linked containers (i.e., a set of containers that, when running on a host computing system, are associated with each other) that are assigned to start as a group. The task definition may specify persistent storage and network locations that the containers associated with the task are able to share on a single physical machine. The task definition may then be utilized for launching the containers associated with the task. A task definition may define and link containers that are distributed to multiple physical hosts. One task definition may contain and schedule many tasks. In some examples, a "task" may refer to an instantiation of the resources specified by the task definition, and may include one or more containers. Tasks may be modified by applying a new task definition to the task.

A container, as referred to herein, may include code and all its dependencies such that an application (also referred to as a task) can run quickly and reliably in an isolated computing environment. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of software containers, a task refers to a container, or multiple containers working together, running to execute the functionality of a software application or a particular component of that application. In some implementations, tasks can also include virtual machines, for example virtual machines running within an instances that hosts the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

As described above, the task definition may specify the information needed to instantiate containers associated with the task. The task definition specifies the information needed to instantiate containers associated with the task as, for example, a set of resource parameters (e.g., a CPU specification, a memory specification, a network specification, and/or a hardware specification) as described below. The task definition may also specify the information needed to instantiate containers associated with the task as a container image (i.e., an image or snapshot of a previously instantiate container) or as an image specification (i.e., a description of an image that may be used to instantiate an image). An image specification and/or an image may be specified by the customer of the computing resource services provider, specified by the computing resource services provider, or specified by some other entity (e.g., a third-party). The task definition may instantiate the containers in a cluster or group that provides isolation of the instances and/or the tasks. The containers and the isolation may be managed through application programming interface ("API") calls as described herein.

The container management service 118 may be a collection of computing resources that operate collectively to process task definitions to perform tasks as described herein by providing and managing tasks and compute instances where the tasks and the associated containers can be executed. The computing resources configured to process task definitions and provide and manage compute instances where the tasks and the associated containers can be executed include at least one of: computer systems (the computer systems including processors and memory), networks, storage devices, executable code, services, processes, modules, or applications. The computing resources configured to process task definitions and provide and manage compute instances where the tasks and the associated containers can be executed may include virtual systems that are implemented on shared hardware hosted by, for example, a computing resource service provider. The container management service 118 may be implemented as a single system or may be implemented as a distributed system, with a plurality of instances operating collectively to process task definitions and provide and manage compute instances where the tasks and the associated containers can be executed. The container management service 118 may operate using computing resources (e.g., other services) that enable the container management service 118 to receive task definitions, instantiate compute instances, communicate with compute instances, and/or otherwise manage compute instances.

In some examples, the replay service 116 may generate and send tasks, corresponding to different events to be replayed, to the container management service 118. In some cases, the container management service 118 may instantiate a software container per event to be replayed. In other cases, a single task definition may correspond to multiple events, and one or more software containers may subsequently be instantiated to process the events.

Figure 2:
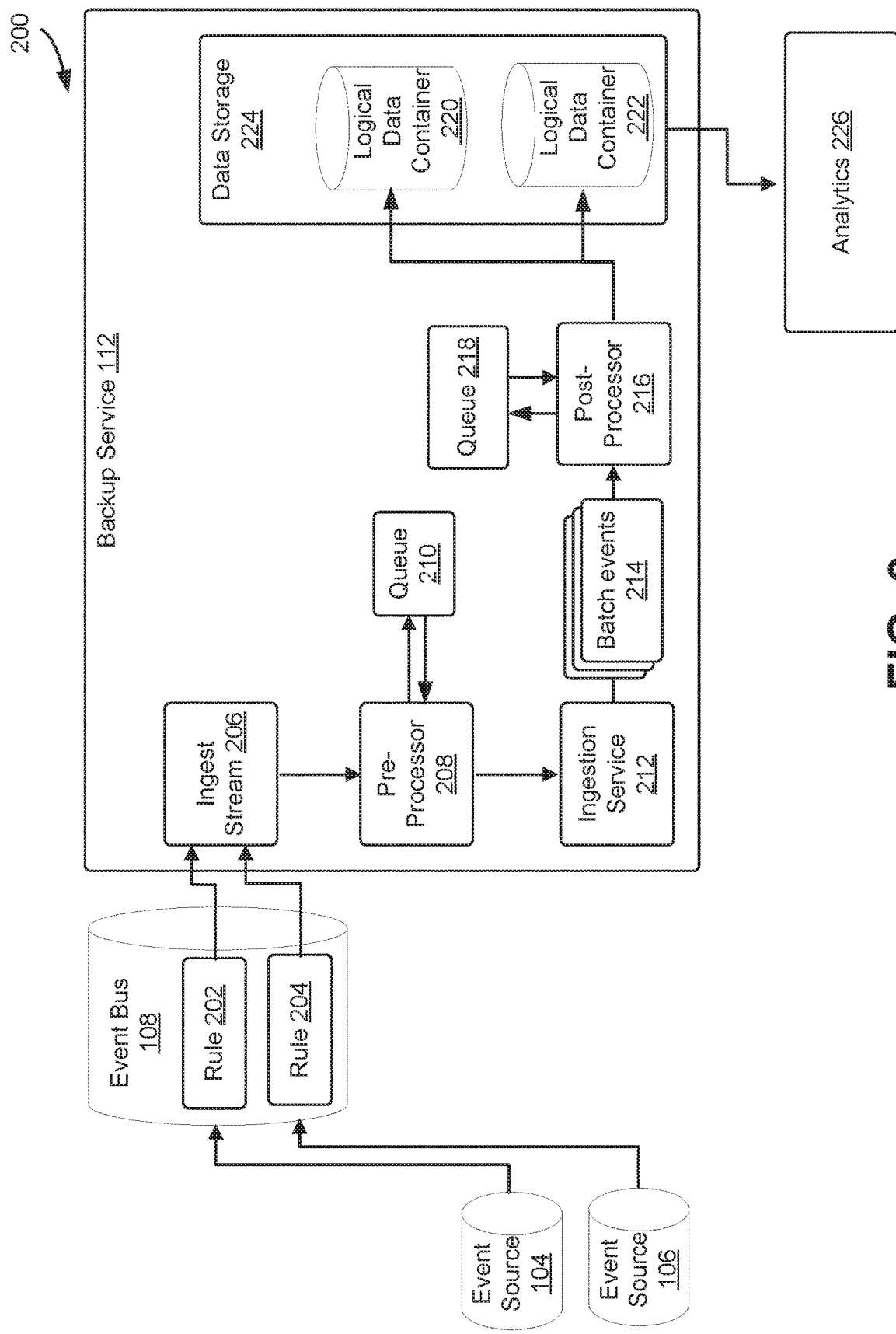
FIG. 2 illustrates an example of an event backup service, according to at least one embodiment.

FIG. 2 illustrates a more detailed example 200 of an event backup service 112, such as may be provided by computer resource service provider 102 described above in reference to FIG. 1. Components of system 200 may include one or more aspects of similarly named and/or number components described above in reference to FIG. 1, and for the sake of brevity, will not be described again here. In some aspects, the backup service 112 may be implemented using one or more aspects of the system described below in reference to FIG. 9.

As illustrated, the event bus 108 may execute a number of rules 202, 204, which define which events are to be sent to the backup service 112 for archiving. It should be appreciated that any of number of rules may be implemented by event bus 108 as part of a rule set or criteria for determining if any event should be archived. In other aspects, as described above in reference to FIG. 1, the rules 202, 204 may additionally or alternatively be stored and/or maintained and updated by backup service 112, or data storage service 114. In some cases, rules 202, 204, etc. may be pulled by the event bus 108 from the backup service 112 or data storage service 114, and in other cases, rules 202, 204 may be pushed to the event bus 108 by the backup service 112 and/or data storage service 114.

Upon receiving one or more events from sources 104, 106, the event bus 108 may direct events satisfying rules 202, 204 to an ingest stream 206 of the backup service 112. In other cases, the ingest stream 206 may pull or otherwise obtain the events satisfying rules 202, 204 from the event bus 108. Ingest stream 206 may be a streaming service provided by the computing resource service provider 102, such as implemented on physical or virtual computing devices. In some cases, events may be sent by the event bus 108 to a single ingest stream of the ingest stream 206 on a per client basis or per logical data container basis, as will be described in greater detail below.

The ingest stream 206 may then trigger pre-processor 208 to generate a partition key for each event. The pre-processor 208 may be provided by a serverless or event-based computing resource, such that it operates without requiring provisioning of dedicated servers and the like. The pre-processor 208 may execute one or more functions for determining or generating a partition key for each event. Each event may be associated with an event ID. In some examples, the partition key may include the event ID and one or more of an indication of the source of the event, a time of the event's occurrence or recordation, some indication of the data contained within the event, or a combination thereof. In some examples, the partition key is a concatenation of the event ID, which may be unique to all clients, and an indication of the event time rounded to a time window, such as one minute. In some examples, if an event gets delayed, either in preprocessing or otherwise, the delayed event may be temporarily sent to a queue 210, for example to hold the event temporarily until whatever error or issue with the event can be resolved. This way, other events in the event stream may not be unnecessarily delayed because of errors and the like.

The pre-processor 208 may send the events with their partition keys to an ingestion service or hub 212. The ingestion service 212 may be a service provided by the computing resource provider 102, and may be executed via one or more physical computing devices or servers, one or more virtual machine instances, or a combination thereof. The ingestion service 212 may buffer the events, per partition, such that each grouping or batch of events 214 will span a certain period of time (e.g., five minutes), a size (e.g., 75 MB), or some other threshold metric. Each batch of events 214 may then be stored in data storage 224 temporarily until the batch or batches of events 214 are ready to be sent to post processor 216. In some cases, a notification may sent per batch of events 214, which will trigger the post-processor 216 to begin processing the batch for storage in data storage 224 for archiving. In this example, the batches of events 214 may not be directly communicated between the ingestion service 212 and the post-processor 216.

In some cases, the ingestion service 212 may select a batch size to balance storage considerations and costs of the storage resources, with quickness in accessing those storage resources and cost to access those resources. In some cases, large batch size may be coupled with larger logical data container size to reduce access time, but this may increase storage costs. Vice versa, smaller batch size spread across a larger number of logical data container size may yield a less costly solution, but may increase the time needed to access and retrieve the events. To address this challenge, in some implementations, batch size may be selected to span a period of time, such as one minute, two minutes, five minutes, or other time periods, to balance these resource cost and access time considerations. In some cases, event data may be compressed to reduce the size of data objects that are stored, to in turn reduce storage costs. In some aspects, storing events based on ingestion time of the event by the event bus may further the goals of efficient storage and access, and provide for a more accurate convention to identify, access, and replay events.

The post-processor 216 may be provided by a serverless or event-based computing resource, such that it operates without requiring provisioning of dedicated servers and the like. The post-processor 216 may execute one or more functions for compressing, encrypting, and/or formatting batches of events 214 for secure and efficient storage 224. For example, the post-processor 216 may obtain a batch of events 214, such as in response to receiving a notification from ingestion service 212. The post-processor 216 may obtain the events from a data store, such as provided by data storage 224, which is in communication with the ingestion service 212. The post-processor 216 may then compress the events using any of a variety of known techniques, including any of a variety of lossless compression techniques. The post-processor 216 may also encrypt the compressed batch of events, such as using any of a variety of encryption techniques, as known in the art. In some cases, the post-processor 216 may also change the formatting of the batch of events from an internal format used by the ingestion service 212 to one that is compatible with storage in the data storage 224, such as combining the multiple events into one or more archival or backup data objects. In some cases, a queue 218 may also be provided to store temporarily store events that have encountered errors in post processing, until the errors can be resolved. Queue 218 may share one or more aspects of queue 210. In some cases, only one queue may be provided that is connected to both the pre-processor 208, and the post-processor 216. Queue 218 may temporarily store events that encounter errors or otherwise slow down or stall the post-processor 216, until a time when the errors can be resolved, to speed up post-processor 216 and the backup service 112.

The post-processor may then store the archival data object in one or more logical data containers 220, 222 of data storage 224. In some aspects, data storage 224 may be provided by the data service 114. In some cases, events satisfying a certain storage criteria, such as may be configured by client 122, may be stored in one or more specific logical data containers 220, 222. The criteria may include events from a certain source, events containing certain data, etc. Events associated with different clients 122 may be stored in different logical data containers 220, 222. In other examples, events for one client 122 may be spread across multiple logical data containers 220, 222, based on region, and/or for better durability or quicker access.

In some cases, the post-processor 216 may also generate a hash of the data object that the data storage 224 will use to verify the data object's integrity once written. In some cases, the post-processor 216 may also calculate metrics on the backup data objects, such as the number of events or original size of the events in the data object, etc., and provide them to a client interfacing component, such as analytics 226. In some aspects, the metrics may be stored in the data storage 224, such that analytics component 226 accesses the metrics from the data store 226. In some cases, these metrics may be attached to the backup data object as metadata. In some cases a notification service, such as provided by the computing resource service provider 102, may generate a notification when data objects are added or deleted from archive data storage 224. The notification may cause the analytics components 226 to calculate one or a number of metrics relating to the data object, such as determining the size of the backups, metering, and/or making the metrics available to the client, such as through the front end 124 or through another service. In some cases, the analytics component or process 226 may monitor failures/latency and throttling coming for all of the downstream dependencies from the backup and replay service 112, 116, end to end latency between the time the event is published into event bus 108 to the moment it's stored in the data store 224, the count of events added to the service queues 210, 218, and/or the total and max number of backup data objects stored in each logical data container 220, 222, and send one or more notifications to the client based on the same. In some cases, these measurements may be used by the backup and/or replay services 112, 116 to change operational parameters, to reduce latency, such as to meet a client specified or other performance standards or quality of service.

In some cases, data storage 224 may be managed by data storage service 114. Data storage service 224 may implement lifecycle rules to automatically delete backup events after they reach the retention period. In some cases, there may be a limit on the number of rules for a given logical data container. In these cases, backup events may be stored across a large number of logical data containers, to bypass these rule limits. In some cases, a logical data container with the least amount of archived data objects out of a large number of logical data containers may be selected for storing the next backup data object. In another implementation, each data object could be tagged with a retention period, to avoid reaching the rule limit.

In one example, a logical data container naming convention may include a service account ID, a region identifier, and a unique number, such as may contain a pad and randomly selected characters. In some cases, a folder/file structure may be used to store the backup events. In these scenarios, each backup file may be under a folder with the same id as the backup internal id or identifier of the individual event. The backup may be composed of multiples files containing client events. The backup files will be partitioned based on the event time (in UTC) trimmed to a time value, such as per 1 minute, 2 minutes, 5 minutes, etc. The time value may be generated or provided by the customer in the backup request. Each backup file may contain one event (e.g., in json) per line. The file will be compressed (e.g., gzipped) and encrypted before being stored in data storage 224. In some cases, the data store 224 may be managed by the backup service 112. In other cases, the client, such as client 122, may select a client location to store the event backups, such as in one or more client logical data containers.

In some examples, data security may be facilitated by an identity and access management (IAM) policy or service, such as may be provided by the computing resource service provider 102. Management of the backup resource will be done using APIs through the front end 124. These APIs may be authenticated and authorized using IAM permissions. Clients may, in some cases, only have access to the underlying data of the backup through the APIs for replaying events through the front end 124, which may also be authenticated and authorized using IAM permissions.

At rest, in the final data storage destination, the client data may be encrypted used customers provided keys provided by a key management service (KMS), which may in turn be provided by the computing resource service provider 102, accordingly to any of a variety of techniques known in the art. In some cases, the key or keys may be customers managed keys, computing resource service provider managed keys, or event bus multi-tenant keys, for example. The encryption used may prevent anyone except the customer to have access to their data. When the client data, including event data is in transit in the backup and replay service 112, 116 and between other services and endpoints of the computing resource service provider 102, client data including event data may be encrypted using one or more keys managed by the backup and replay service 112, 116.

In some cases, alternate implementations of backup service 112 may be utilized. In one alternate configuration, batching may be performed by an ingestion queue, a batching fleet, and a delivery queue. In this example, the ingestion queues may be provided by a managed message queueing service, such as may be provided by a computing resource service provider 102. The number of individual queues can be scaled up based on incoming traffic/events to back up, with each queue designated to store one or a set size or number of events to be backed up. Batching may then be performed by a fleet of computing resources, such as virtual machine instances, software containers, or serverless computing resources, utilizing a similar process described above utilizing partition ID and ingestion time to organize and batch events. The batches may then be delivered to and stored in one or more delivery queues, which will then persist the batches of events into data storage 224.

In another alternate implementation, an ingestion stream, such as ingest stream 206 may create a stream per backup (e.g., one or more events or series of events). The events may then be batched into batches corresponding to a set interval or window of time (e.g., one minute), and the batches may be stored temporarily in data storage 224. The batches can then be repartitioned and stored in the repatriated state into data storage 224 based on ingestion time of the events, for example. It should be appreciated that each of the above examples, or a combination thereof, may be utilized by backup service 112 to a similar effect. In some cases, one or more aspects of the above-described implementations may be combined to accommodate limited availability of resources, to optimize certain patterns of backups requested by clients.

Figure 3:
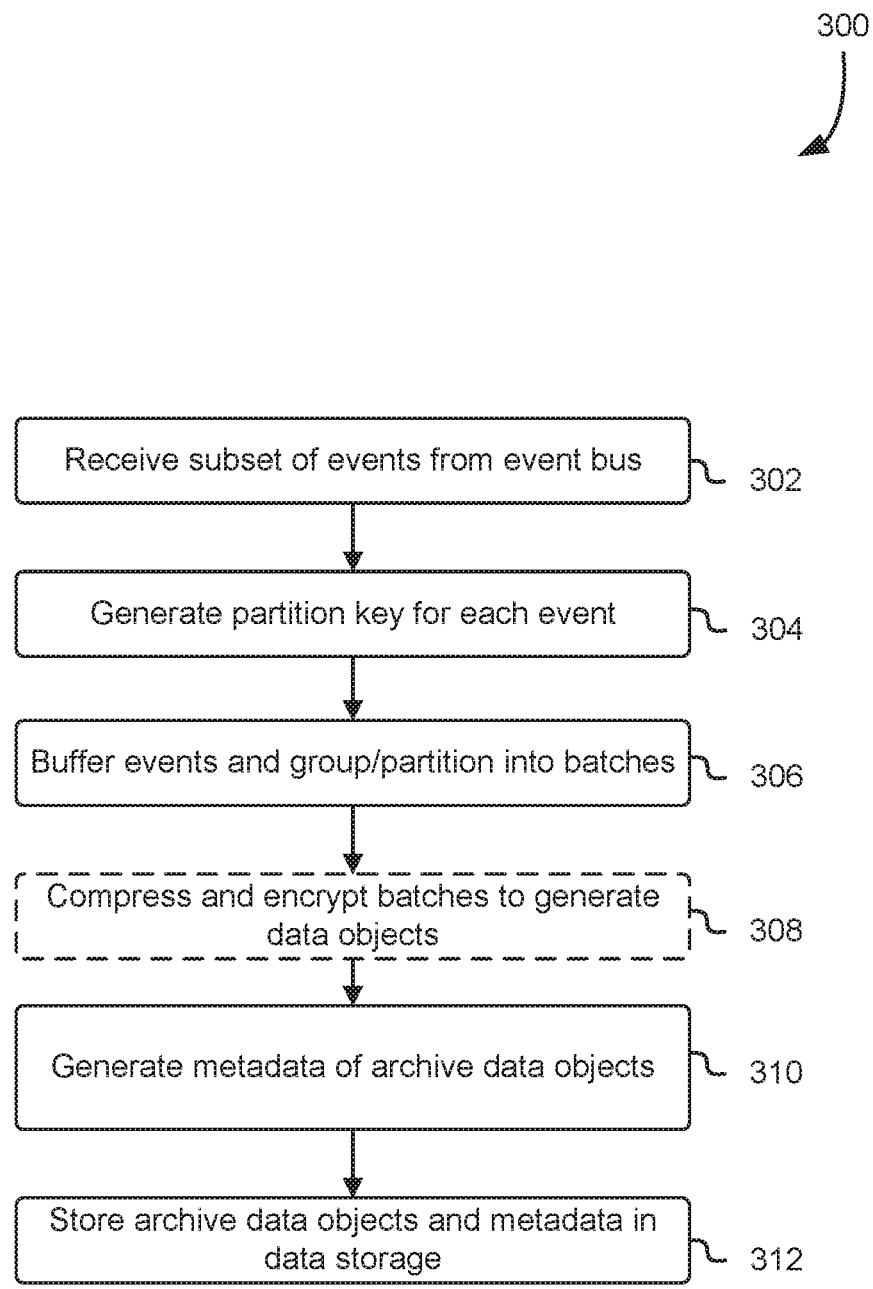
FIG. 3 illustrates an example process for ingesting and storing events in an archival data store, such as may be performed by the backup service of FIGS. 1 and 2, according to at least one embodiment.

FIG. 3 illustrates an example process 300 for ingesting and storing events in an archival data store, such as may be performed by the backup service 112 described above in reference to FIGS. 1 and 2. As used throughout this disclosure, components of process steps indicated by dotted lines indicate that the component or process step is optional, such that, in some cases, the system or process may operate or be performed without the optional component or process step.

Process 300 may begin at operation 302, where events may be received from an event bus, such as an event bus 108. In some cases, a backup service 112 may receive or obtain the events through an ingest stream, such as ingest stream 206, as described above. In some cases, the events received may be selected or filtered using one or a number of backup criteria or rules, such as rules 202, 204, as described above.

A partition key or other identifier may be generated for each event, at operation 304. Operation 304 may, in some cases, be performed by pre-processor 208. Each event may be associated with an event ID when it is published at the event bus. In some examples, the partition key may be generated to include the event ID and one or more of an indication of the source of the event, a time of the event's occurrence or recordation, some indication of the data contained within the event, or a combination thereof. In some examples, the partition key may be generated by taking a concatenation of the event ID, which may be unique to all clients, and an indication of the event time associated with the event, such as rounded to a time window, such as one minute. The time window may be selected based on amount of data in the events, granularity at which a client will seek to access events from the backup service in the future, etc.

Next, at operation 306, events may be grouped or partitioned into batches and buffered, such that they may be stored in a queue or temporary storage. In some cases, this may include storing the batches of events in or by a database service, such as may be provided by a computing resource service provider. In some cases, operation 308 may be performed by an ingestion service, such as ingestion service 212 as described above. In some cases, the events may be grouped according to a time window, such that events associated with an event time or timestamp falling within a certain period are grouped together. In yet other cases, events may be grouped according to source, event time, attribute of data associated with the event, etc., such that the grouping has a maximum size value (e.g., 75 MB or other value).

In some examples, process 300 may also include operation 308, in which the batches of events may be compressed and encrypted. Operation 308 may be performed by post-processor 216. Any of a variety of encryption and compression techniques may be utilized, as known in the art. In some cases, operation 308 may additionally or alternatively include formatting the batch of events for more efficient storage in the archive data store, such as data store 224. In some cases, this may include combining the events and organizing them in a file/folder or subfolder structure, as described above in reference to FIG. 2.

At operation 310, metadata of the archived data objects may be generated, and the metadata and the data objects corresponding to batches of events (e.g., containing the file/folder structure) may be stored in a data store, such as data store 224, at operation 312. Operations 310 and 312 may be performed by the post-processor 216 described above. In some cases, the metadata may include or indicate one or more attributes of events in the data object, such as type of data, data source, timestamp, and/or size, location of each event in the data object, etc.

Figure 4:
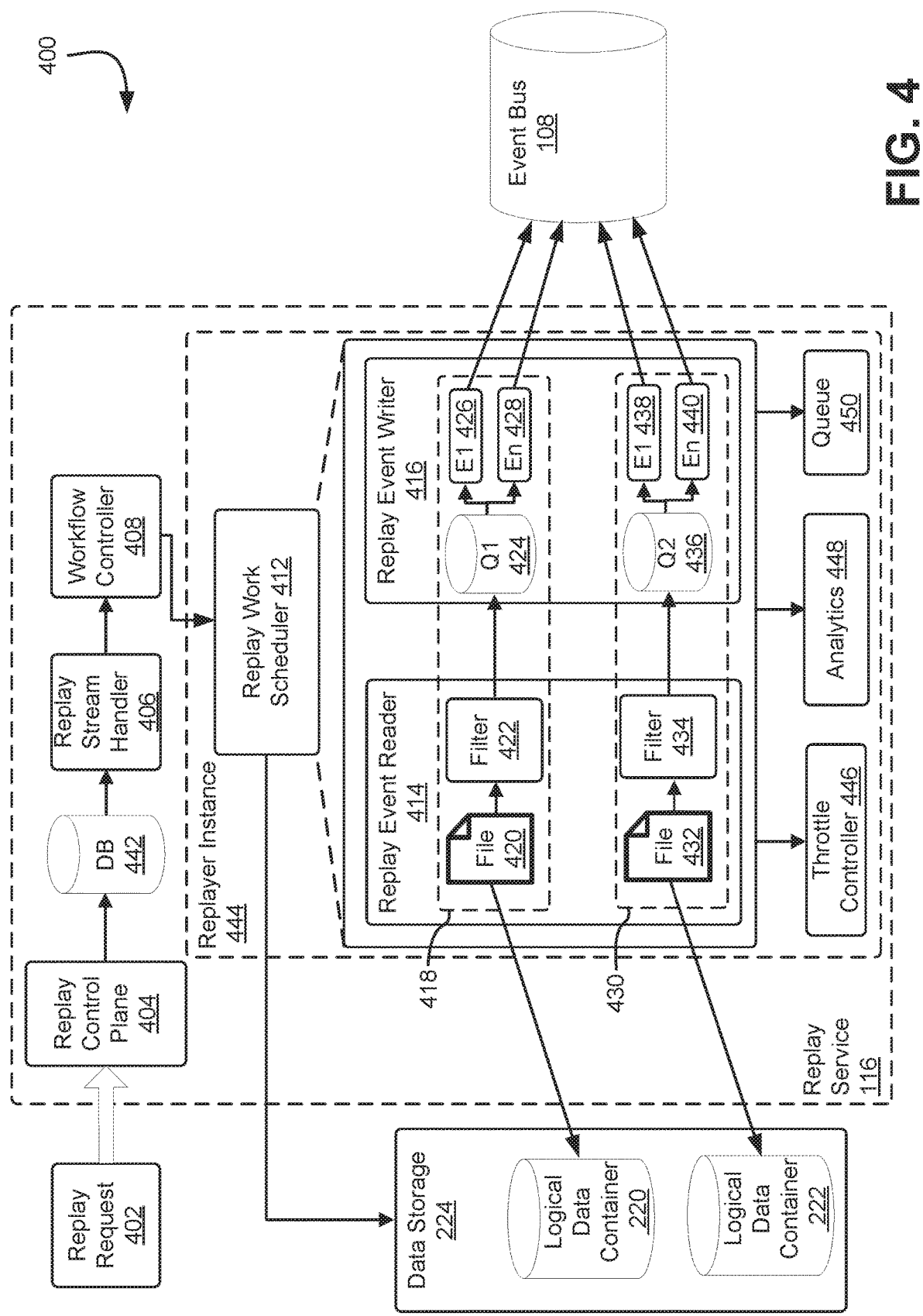
FIG. 4 illustrates an example of an event replay service, according to at least one embodiment.

FIG. 4 illustrates a more detailed example 400 of an event replay service 116, such as may be provided by computer resource service provider 102 described above in reference to FIG. 1. Components of system 400 may include one or more aspects of similarly named and/or number components described above in reference to FIG. 1, and for the sake of brevity, will not be described again here. Replay service 116 may include various components and functions for replaying events to an event bus, such as event bus 108 described above, responsive to receiving a replay request, such as replay request 402 from a client. In some aspects, the replay service 116 may be implemented using one or more aspects of the system described below in reference to FIG. 9.

As illustrated, the replay service 116 may include a replay control plane 404. The replay control plane 404 may provide API operations for processing replay requests. The replay control plane 404 may obtain a request to replay one or more events 402, such as from the front end 124 of system 100. The request 402 may include some type of identifier of one or more events that a client seeks to replay through the event bus 108. The request 402 may indicate one or more events by an event ID, a source, a time or time window that the event was generated, a type of event, or other identifier or attribute of one or more events. In some cases, the request may specify certain criteria for selecting which events to replay, for example over a specified time window. For example, a user may specify that all events within a given time window reigning from a first source are to be replayed.

As will be described below, the filters 422, 434 may select the appropriate events for replay based on the criteria indicated in the request 402. The replay control plane 404 may ingest the request and store the request information in a database or other storage location, such as database 442, which may be an on demand database provided by a computing resource service provider.

In some examples, the information contained in the replay request 402 may be converted to a table or other data structure that includes a replay identification and various attributes of the replay request. In some cases, the table or data structure may be stored in database 442 and updated as the replay is executed. In some cases the replay data structure may include one or more of an account identification a replay identification, a start time and end time of the event or series of events to be replayed, execution start and end times indicated when the replay service 116 actually replays the events, a last replay event time, status (e.g., running or canceled), one or more rules or criteria for selecting which events to replay, a timestamp indicating when the replay data structure was last modified, and/or an expiration time for the replay.

In some cases, the replay control plane 402 may send the replay request to a notification service, which the workflow controller 408 may subscribe to. The workflow controller 408 may be a process or function executed by the replay service 116. In some cases, workflow controller 408 may be a function provided by a serverless or event-based computing service, such as provided by a computing resource service provider. Upon receiving a notification that a replay request 402 has been received by the control plane 402, the workflow controller 408 may instruct a replay stream handler 406, which may be a process executed by the replay service 116, to obtain the request from database 442, and deliver it to the workflow controller 408.

In response to receiving the replay request 402, the workflow controller 408 may launch a replayer instance 444. The replayer instance 444 may include a step functions workflow or other computing process for launching computing resources, such as software containers, to process, extract, and replay events. In some cases, the replayer instance 444 may be a virtual machine or virtual machine instance instantiated to launch containers to obtain, process, and replay events to the event bus 108. In some cases, the workflow controller 408 may be responsible for starting a replay workflow and for cancelling a replay workflow as will be described in greater detail below in reference to FIGS. 5 and 6. As used herein, a step functions workflow may be a serverless function orchestrator that links various functions to one or more services, such that an output of one service or function may be used as an input to another service or function. A step functions workflow may be an event driven workflow that executes one or more functions defined by logical operators.

The replayer instance 444 may include a number of components that read data from archival data storage, filter the events, and replay them to an event bus, such as event bus 108. The replayer instance 444 may monitor and update a status of the event replay maintained by the workflow controller 408 and/or database 442. In some cases, one or more functions may be used to monitor the replay execution status of the different components of replayer instance 444, as will be described in greater detail below.

The replayer instance 444 may include a replay work scheduler 412, which may be a process running within the workflow of the replayer instance 444. The replay work scheduler 412 may launch one or more workers or tasks 418, 430, each to be responsible for processing one or a number of files or data objects corresponding to one or more events. In some cases, the replay work scheduler 412 may determine how many workers 418, 430 to launch based on the number of events encompassed by the request. The replay work scheduler 412 may monitor each task launched for success and failure, and may update the status of a replay execution to running upon launch. The replay work scheduler 412 may also be responsible for shutting down workers 418, 430.

In some cases, each event to be replayed may be structured as its own task 418, 430, to be executed by a software. In other cases, a single task may be responsible for replaying a number of events. Each worker or task 418, 430 may receive an input to begin processing a task, for example, from the replay work scheduler 412. The input may include a replay ID and an identification of the data objects or files containing the requested event or events. In some cases, the workflow controller 408 or the replay work scheduler 412 may determine which data objects or files/folders contain the requested events, for example, by looking at an index of the archival data storage 224. The replayer instance 444 may instantiate the tasks or workers 418, 430, for example, by sending a task definition to a container management service, such as service 118 described above in reference to FIG. 1. In some cases, the default configuration for the worker may include a single file or data object. In some cases, additional workers 418, 430 may be added until a maximum number is reached and/or there are no more events to process. The maximum number of workers 418, 430 may be set as a system default, or may be set according to a client's subscription to the backup and replay service 112, 116.

Each worker 418, 430 may execute two primary functions, a replay event reader function 414 and a replay event writer function 416. Replay event reader function 414 may perform the following steps, including download or obtain files or data objects 420,432 that the worker 418, 430 is responsible for processing from data storage 224, such as from one or multiple logical data containers 220, 222. In some cases, the replay event reader function 414 of worker 418, 430 may obtain the file using one or more API calls to the data storage 224, such as indicating the partition key, event ID, timestamp, or other data used to retrieve the correct data objects or files. Each worker 418, 430 may validate the data object or files for corruption, such as using a hash stored with the data object (e.g., as generated by the post processor 216). Replay event reader function 414 of worker 418, 430 may then decrypt the file using one or more keys provided by a key management service, such as was used to encrypt the data object upon archiving. The replay event reader function 414 of worker 418, 430 may also decompress the data object or file, and additionally map the events stored in the file or data object 420, 432 into JSON object or other format usable by the event bus 108. The replay event reader function 414 of worker 418, 430 may then use one or more filters 422, 434, such as one or more event pattern filters to isolate the requested events. In some cases, the event pattern filters may be implemented by a set of rules or rule library for isolating specific events based on the event ID, data of the event, source of event, or metadata associated with the event. In some cases, filters 422, 434 may be configured to select events according to a criteria indicated in request 402. In some cases, the filters may select specific events from one or more data objects based on a variety of factors/criteria indicated in the request 402, including source of the event, time of the event, status of the event, key words or identifiers associated with the event, or any other characteristic of the vent contained in the event data or event metadata. In yet some cases, the criteria indicated in the request 402 may include relative criteria, such as to replay events occurring between two points, such as between two events, whereby the filters 422, 434 may select events for replay that satisfy the criteria. The replay event reader function 414 of worker 418, 430 may then construct the replay event or events and write them into a memory queue 425, 436.

The replay event writer function 416 of each worker 418, 430 may then read the events 426, 428, 438, 440 from the respective queues 424, 436 and write them to the event bus 108. If any failure happens, the respective replay event writer function 416 of worker 418, 430 may retry for X number of times, where X may vary according to implementation or be specified by the customer, and if that does not succeed, may move the problematic event to queue 450, and cause a report or log to be sent in response to the replay request 402 indicating the error, such as through the replay work scheduler 412.

In some aspects, the replayer instance 444 may also include a throttle controller 446. The throttle controller 446 may be a process of function executed by the replay service 116, and may control via one or more limits, a rate at which events are sent to the event bus for replay. In some cases, the throttle limit may be set by replay service 116, such as may be based on a client's subscription to the service, or it may be based on one or more limits set by the computing resource service provider. In other cases, the client or request 402 may specify a throttling rate for other purposes, such as to slow down replay of events to the event bus 108 for a umber o reasons, such as to enable more close monitoring of how each event is processed by the event bus 108.

In some cases, the replayer instance 444 may also include an analytics component or process 448 that may monitor the operation of the workers in processing and publishing events to event bus 108. The analytics component 448 may provide reports through the replay work scheduler 414 to a client or other services, etc. In some cases, the analytic component 448 may monitor errors and/or a rate at which events are published to the event bus 108, and make real time or near real time operational changes to address an errors or failure in operation of various components of the replayer instance 444.

In some aspects, the replayer instance 444 may scale up or down the number of workers 418, 430 active to process and publish events to the event bus 108, for example, to satisfy an operational transactions per second (TPS) or other metric. In some cases, if a replay event reader process 414 or worker 418, 430 observers queue 424, 436 sizes increased above a threshold, the event reader process may be paused, and stop enqueuing new events. In some cases, if the queue 424, 436 size does not decrease within a specified period of time, the worker 418, 430 may shut itself down. In some examples, the replay events writer process 416 will retry, for a certain number of times, all the failed events for a recoverable exception. This will prevent it from responding to temporary failures like network connection etc. For non-recoverable exceptions, the replay events writer process 416 may move failed events to queue 450, so that other events may continue to be published to event bus 108.

In some cases, the replay event writer 416 may utilize a default or maximum batch size for sending events in batches to the event bus 108. In some cases, more events may be batched together to increase the speed (e.g., measured by TPS) at which events are replayed.

In some implementations, other computing resources, instead of software containers, may be utilized to process and publish events to the event bus 108. For example, in some cases, where lower latency is a higher priority and for smaller batch sizes, compute functions (e.g., serverless) may be utilized instead of workflows implemented on on-demand software containers.

Figure 5:
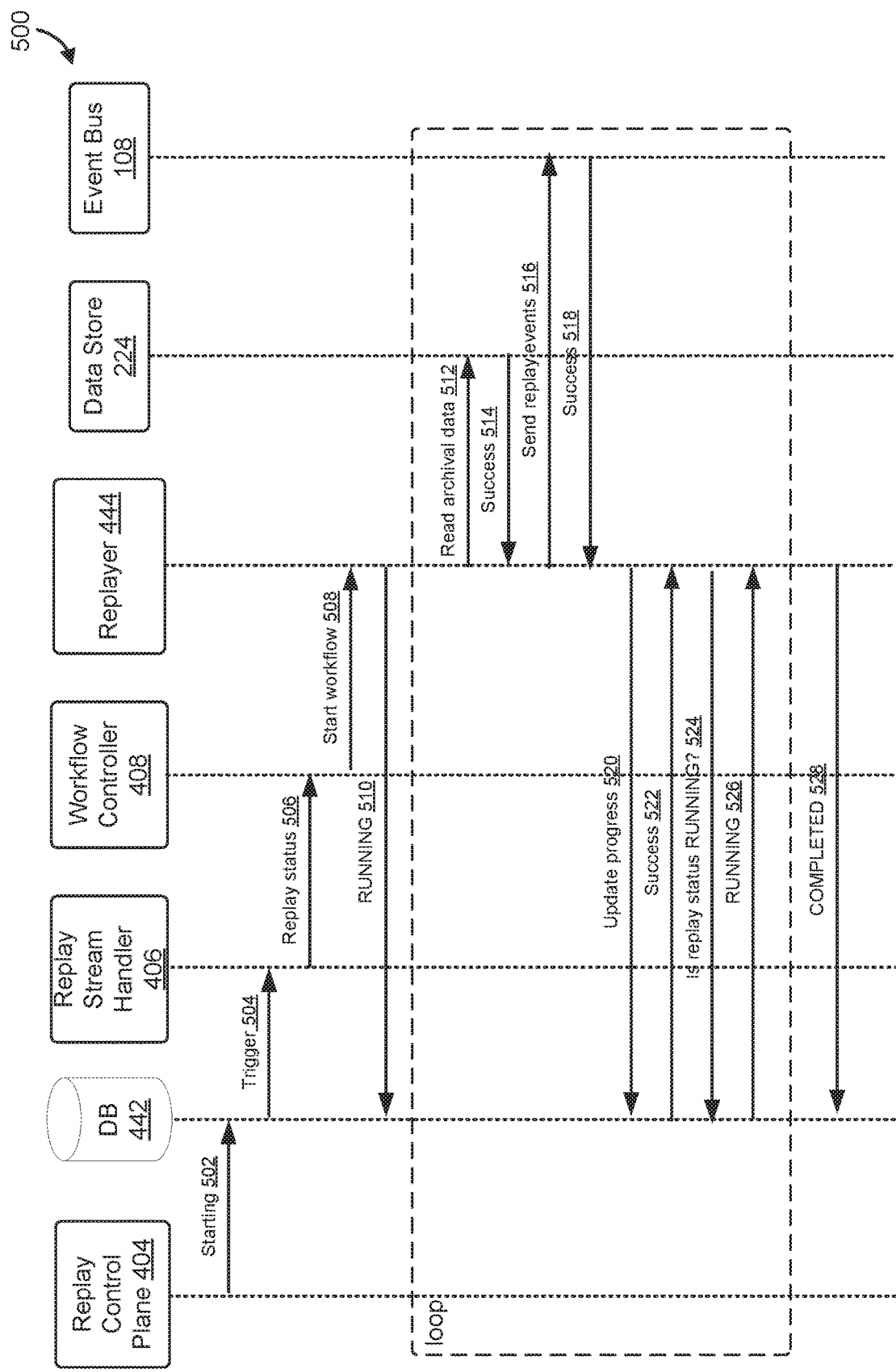
FIG. 5 illustrates an example process for replaying an event though an event bus, such as may be performed by the replay service of FIGS. 1 and 4, according to at least one embodiment.

FIG. 5 illustrates an example process 500 for replaying an event though an event bus, such as may be performed by the replay service 116 described above in reference to FIGS. 1 and 4. Process 500 may begin with the replay control plane 404 receiving a request to replay one or more events, and sending a message indicating the same to database 442 at operation 502. The database 442 may in turn send a trigger at operation 504 to the replay stream handler 406 to request a replay status from the workflow controller 408, at operation 506. In some cases, the stream replay handler 406 may first send the trigger to a notification service, which may in turn publish the trigger to the workflow controller 408. The workflow controller 408 may start a replayer instance workflow, at operation 508, to begin obtaining, processing, and publishing events specified in the request to an event bus, as described in greater detail above in reference to FIG. 4. In some cases the replayer instance 444 may send an update status of running to the database 442.

The replayer instance 444 may then read the archival data from data store 224 at operation 512, and upon a successful read, the data store 224 may return a success notification at operation 514. The replayer instance 444 may then publish the event or events (such as in batches) to the event bus 108, at operation 516, and upon the event bus 108 successfully the event, return a success notification to the replayer instance at operation 518. At periodic or other various intervals, including successfully publishing X number of events, where X may vary according to implementation or be specified by the customer, to the event bus 108, the replayer instance 444 may update progress with the database 442, at operation 520, and the database 442 may confirm at operation 522. The database 442, as described above, may be accessed by one or more notification services to update a client on the replay status of the request using the information stored in the database 442. In some cases, the database 442 may check to see if the replay instance is still running, at operation 524, whereby if running, the replayer instance 444 may return an indication of running, at operation 526.

Process 500 may continue to loop through operations 512-526, until all the events in the replay request have been processed an published to the event bus 108, at which point the replayer instance 444 may update a status stored in the database 442 as completed, and process 500 may end.

Figure 6:
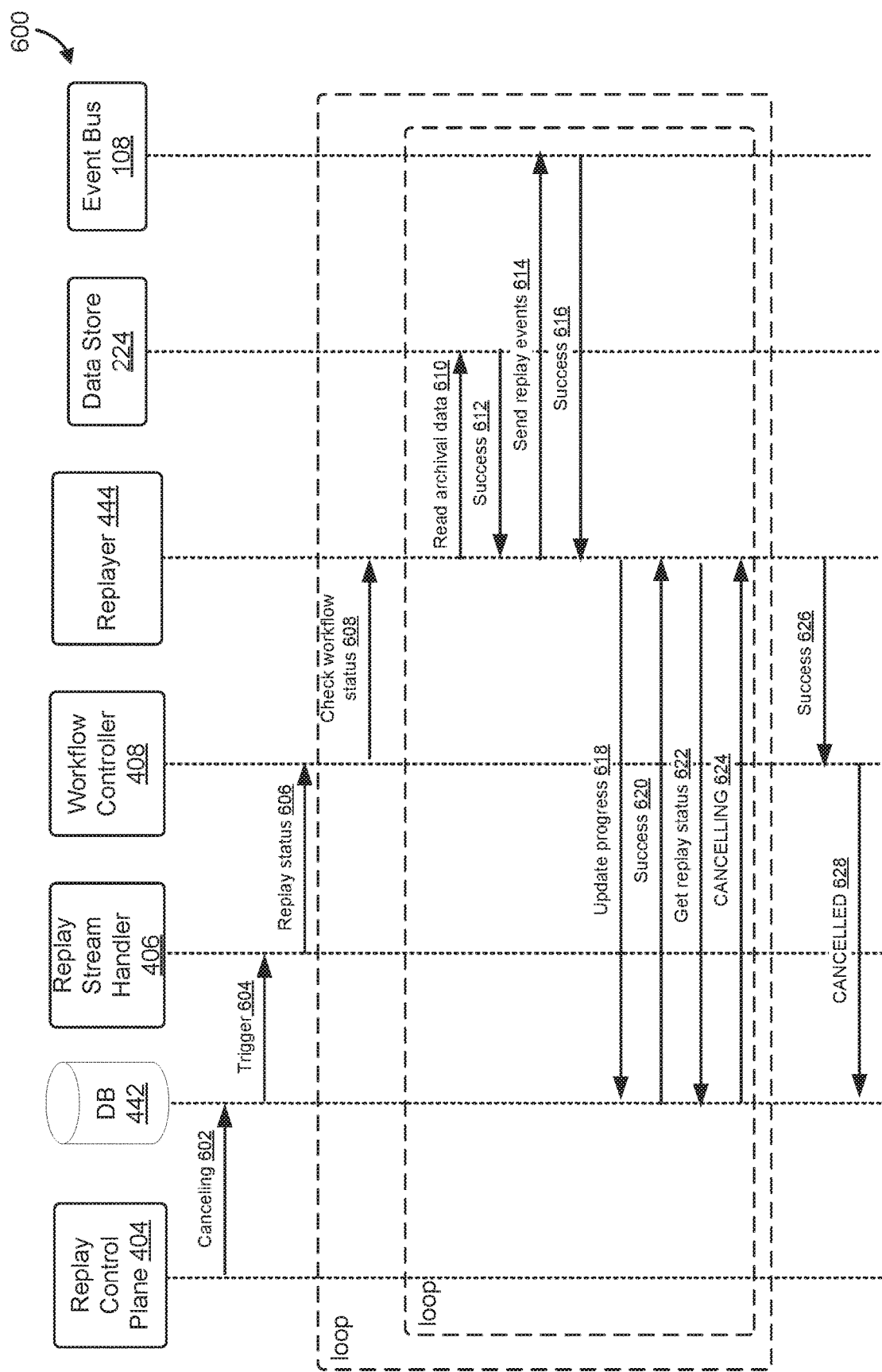
FIG. 6 illustrates an example process for cancelling a replay event though an event bus, such as may be performed by the replay service of FIGS. 1 and 4, according to at least one embodiment.

FIG. 6 illustrates an example process 600 for cancelling a replay event though an event bus, such as may be performed by the replay service 116 described above in reference to FIGS. 1 and 4. Process 600 may begin with the replay control plane 404 receiving a request to cancel the replay one or more events, and sending a message indicated the request to cancel to database 442 at operation 602. The database 442 may in turn send a trigger at operation 604 to the replay stream handler 406 to request a replay status from the workflow controller 408, at operation 606. In some cases, the stream replay handler 406 may first send the trigger to a notification service, which may in turn request a workflow status from the replayer instance 444 at operation 608.

Concurrently, the replayer instance 444 may be reading the archival data from data store 224 at operation 610, and upon a successful read, the data store 224 may return a success notification at operation 612. The replayer instance 444 may then publish the event or events (such as in batches) to the event bus 108, at operation 614, and upon the event bus 108 successfully the event, return a success notification to the replayer instance at operation 616. At periodic or other various intervals, including successfully publishing X number of events, where X may vary according to implementation or be specified by the customer, to the event bus 108, or in this case, receiving a request to check the status of the replay workflow, the replayer instance 444 may update progress with the database 442, at operation 618, and the database 442 may confirm at operation 620. The database 442, as described above, may be accessed by one or more notification services to update a client on the replay status of the request using the information stored in the database 442. In some cases, the replayer instance 444 may then request the current replay status from the database 442, at operation 622. In response to the request to cancel the event replay, the database 442 may return a status of cancelling to the replayer instance 444, at operation 622. In response, the replayer instance may confirm the status of cancelling with the workflow controller 408, at operation 408, at which point the workflow controller 408 may shut down the replayer instance 444, and update the database to reflect the cancelled status, at operation 628. In some cases, process 600 may continue to loop through operations 612-624, until an event replay is actually canceled. At which point operations 626 and 628 may be triggered.

Figure 7:
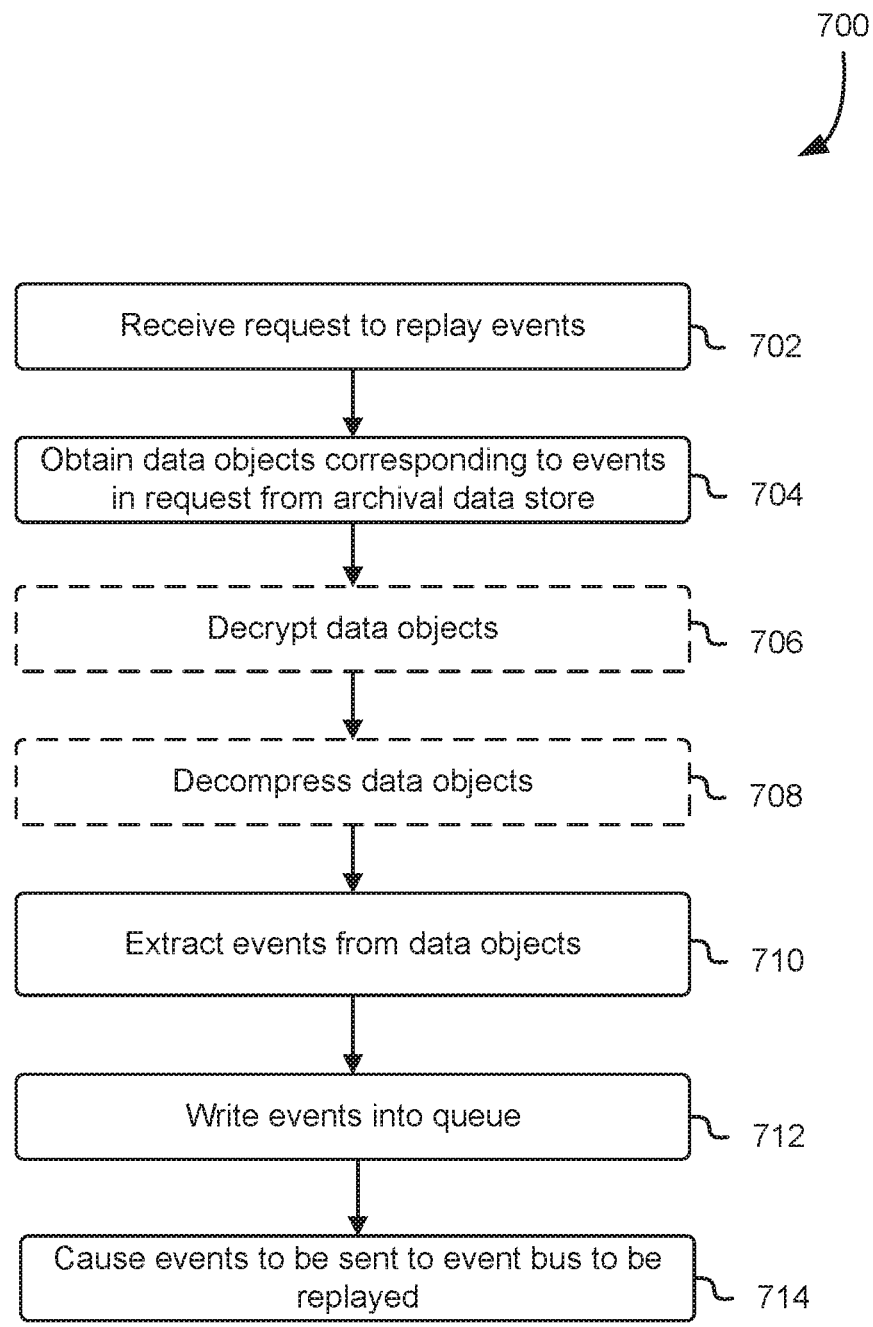
FIG. 7 illustrates another example process for replaying an event though an event bus, such as may be performed by the replay service of FIGS. 1 and 4, according to at least one embodiment.

FIG. 7 illustrates another example process for replaying an event though an event bus, such as may be performed by the replay service 116 described above in reference to FIGS. 1 and 4. As used throughout this disclosure, components of process steps indicated by dotted lines indicate that the component or process step is optional, such that, in some cases, the system or process may operate or be performed without the optional component or process step.

Process 700 may begin at operation 702, where a request to replay one or more events may be received, for example, by an event replay service 116. In some cases, the request may first be received by a front end, such as front end 124 of a computing resource service provider 102. In some cases, the request may be routed to a replay control plane 404. The request may indicate which events are to be replayed, such as by event ID, time stamp or time window, or other data or metadata associated with one or more events.

At operation 704, data objects or files corresponding to the events indicated in the request may be obtained from an archival data store, such as data store 24. In some cases, operation 704 may be performed by one or more worker or task executed by a replayer instance 444, as described above in reference to FIG. 4. In some cases, where the archived data has been encrypted and compressed prior to storage, process 700 may include operations 706 and 708, in which the obtained data objects may be de-encrypted and decompressed. Similarly, in some cases, operations 706 and 708 may be performed by one or more worker or task executed by a replayer instance 444, as described above in reference to FIG. 4.

Next, at operation 710, one or more events, indicated in the request, may be extracted from the data objects or files. In some cases, operation 710 may include isolating events from the data object or file, such as using one or more filters or rules, and/or converting them into a format usable by an event bus. The filtered events may then be written to one or more queues, at operation 712, and sent, such as in batches, to be reprocessed by the event bus, at operation 714, as described above in more detail in reference to FIG. 4. In some cases, one or more of operations 710, 712, and 714 may be performed by one or more worker or task executed by a replayer instance 444, as described above in reference to FIG. 4.

Figure 8:
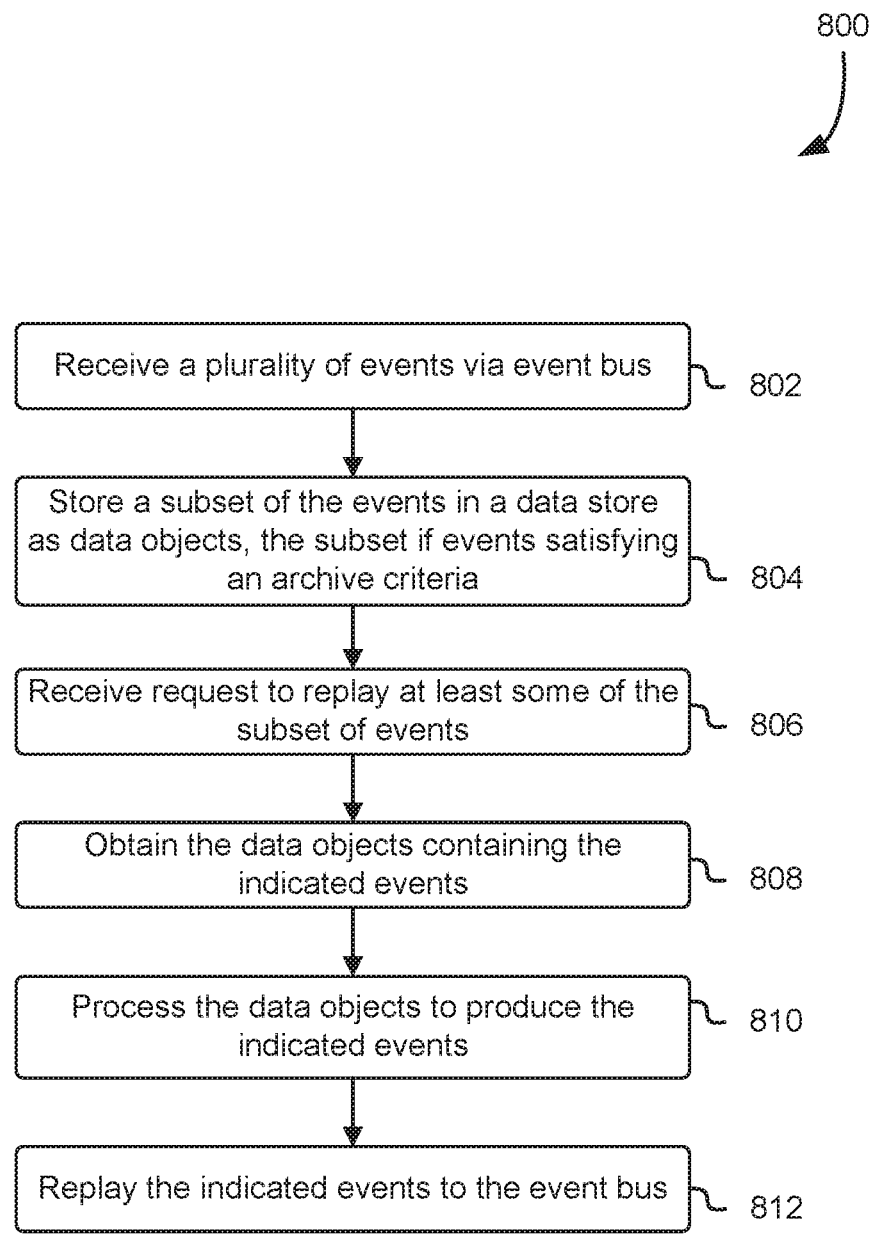
FIG. 8 illustrates another example process for archiving and replaying an event though an event bus, such as may be performed by the backup service and replay service, according to at least one embodiment.

FIG. 8 illustrates another example process 800 for archiving and replaying an event though an event bus, such as may be performed by the backup service 112 and replay service 116 described above.

Process 800 may being at operation 802, in which a plurality of events may be received at an event bus, such as event bus 108 described above. Some or all of the events (e.g., a subset of events) may be selected for archiving, such as based on one or more client defined rules or archive criteria. Those selected events may then be stored in a data store as data objects or files/folders, at operation 804. In some case, operation 804 may be performed by a backup service, such as backup service 112 described above.

At operation 806, the backup and replay service 112, 116 may receive a request to replay at least some of the events in the archived subset of events, as descried in greater detail above. In some examples, the replay service may obtain the data objects containing the requested events form the archival data store, at operation 808, and process the data objects to produce the indicated events, at operation 810. The replay service may subsequently publish the obtained events to the event bus, to be reprocessed by the event bus a sent to an appropriate target for further processing, at operation 812.

Figure 9:
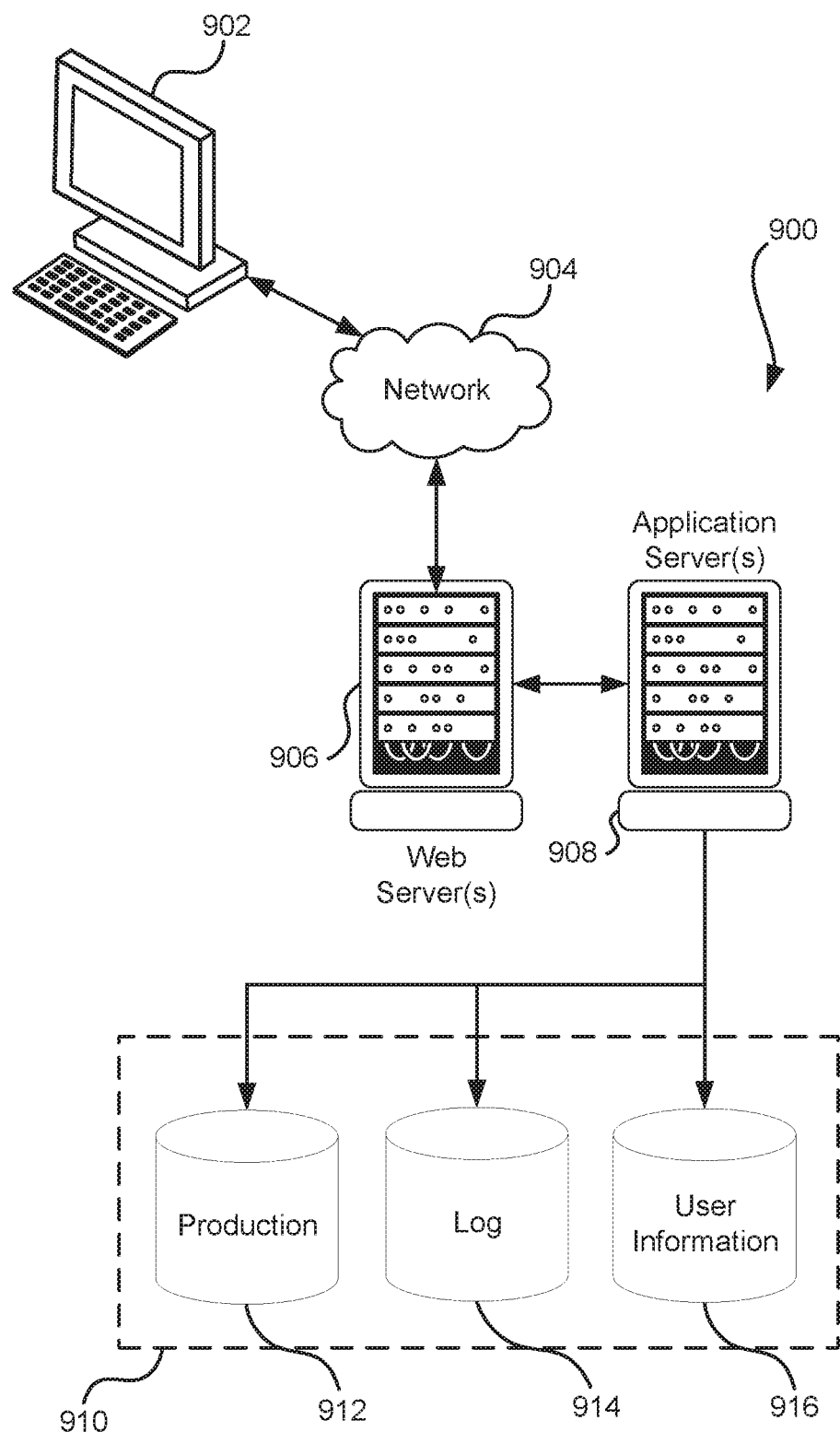
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, which may be an example of or implement one or more aspects of data storage service 114 and/or data storage 224 described above, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory that stores computer-executable instructions that, as a result of being executed by the one or more processors, cause the system to:
    receive, via an event bus provided by a computing resource service provider, a plurality of events, the event bus routing the plurality of events to a plurality of targets that process the plurality of events, an individual event of the plurality of events comprising data and metadata;
    store, as a result of a subset of the plurality of events satisfying specified archive criteria, the subset of events in a data store as a plurality of data objects; and
    responsive to receiving a request to replay the subset of events, cause a software container to:
        obtain the plurality of data objects corresponding to the subset of events from the data store;
        process the plurality of data objects to produce the subset of events; and
        replay the subset of events to the event bus thereby causing the event bus to route the subset of events to at least one target of the plurality of targets.

2. The system of claim 1, wherein the metadata of individual events comprises a timestamp, and wherein the computer-executable instructions further include instructions that further cause the system to:
    group, based on the timestamps of individual events of the subset of events, individual events of the subset of events into the plurality of data objects having a partition ID such that the individual events in a data object of the plurality of data objects corresponds to a duration of time.

3. The system of claim 2, wherein:
the request is associated with at least one of a time window or a filter; and
the computer-executable instructions further include instructions that further cause the system to identify at least one data object of the plurality of data objects corresponding to the at least one event satisfying the time window or the filter based on at least one of:
    the partition ID,
    the data, or
    the metadata associated with the at least one event; and
the computer-executable instructions that cause the system to obtain the plurality of data objects include instructions that further cause the system to obtain the at least one data object identified.

4. The system of claim 1, wherein the computer-executable instructions further include instructions that further cause the system to:
    throttle a rate at which the at least one event is replayed back to the event bus based on at least one of a computing limit associated with the request or a replay speed indicated in the request.

5. A computer-implement method, comprising:
receiving a request to replay at least one event of a plurality of events processed by an event bus, wherein an individual event of the plurality of events comprises data and metadata indicating at least one attribute of the data, the event bus having processed the at least one event by directing the at least one event to a target to cause the target to perform an operation on the data;
obtaining at least one data object corresponding to the at least one event from an event archive, the event archive storing the plurality of events in a plurality of data objects, the plurality of events grouped into data objects in the event archive according to attributes indicated by metadata of corresponding events;
extracting the at least one event from the at least one data object; and
sending the at least one event to the event bus to be reprocessed by the event bus and directed to the target to perform the operation on the data.

6. The computer-implemented method of claim 5, further comprising:
receiving, from the event bus, a subset of events of the plurality of events, wherein metadata of the subset of events satisfies an archive criteria;
grouping the subset of events into data objects of the plurality of data objects based on the metadata of the subset of events; and
storing the data objects in the data storage.

7. The computer-implemented method of claim 6, wherein the archive criteria comprises a set of user defined rules for selecting which events to store in the data store.

8. The computer-implemented method of claim 6, wherein
storing the data objects in the data storage further comprises compressing the plurality of data object; and
extracting the at least one event from the at least one data object further comprises decompressing the at least one data object.

9. The computer-implemented method of claim 6, wherein
storing the data objects in the data storage further comprises encrypting the plurality of data object; and
extracting the at least one event from the at least one data object further comprises decrypting the at least one data object.

10. The computer-implemented method of claim 5, wherein:
the computer-implemented method further comprises, responsive to receiving the request, provisioning at least one software container; and
obtaining the at least one data object, extracting the at least one event, and sending the at least one event are performed by the at least one software container.

11. The computer-implemented method of claim 10, wherein a separate software container is provisioned for each event of the at least one event to be reprocessed by the event bus.

12. The computer-implemented method of claim 5, further comprising throttling a rate at which the at least one event is sent to the event bus based on at least one of a computing limit associated with the request or a replay speed indicated in the request.

13. A non-transitory computer-readable storage medium storing thereon executable instructions that, as a result of being executed by one or more processors of a computer system, cause the computer system to at least:
receive, from an event bus provided by a computing resource service provider, an event of a plurality of events, the event comprising data and metadata indicating an attribute of the data, the event bus directing the event to a target;
as a result of the event satisfying archive criteria, cause the event to be stored as a data object in a data store; and
responsive to receipt of a request to replay the event:
obtain the data object corresponding to the event from the data store;
process the data object to extract the event; and
cause, by providing the event to the event bus, the event bus to re-direct the event to the target.

14. The non-transitory computer-readable storage medium of claim 13, wherein:
the data object includes multiple events of the plurality of events; and
the executable instructions that cause the computer system to process the data object to extract the event further comprises instructions that further cause the computer system to select the event from the multiple events contained in the data object based on a criteria indicated in the request.

15. The non-transitory computer-readable storage medium of claim 14, wherein the executable instructions further comprise instructions that, as a result of being executed by the one or more processors, further cause the computer system to group the multiple events together to be stored as the data object in the data store based on the attribute of the data of the multiple events satisfying a storage criteria.

16. The non-transitory computer-readable storage medium of claim 15, wherein the attribute indicates an event time and the storage criteria comprises a time window.

17. The non-transitory computer-readable storage medium of claim 13, wherein:
the executable instructions further comprise instructions that, as a result of being executed by the one or more processors, further cause the computer system to, responsive to receipt of the request, provision at least one software container; and
the executable instructions that cause the computer system to obtain the data object, process the data object, and cause the event bus to re-direct the event to the target are performed by the at least one software container.

18. The non-transitory computer-readable storage medium of claim 13, wherein:
the request to replay the event comprises a request to replay a subset of events of the plurality of events;
the executable instructions further comprise instructions that, as a result of being executed by the one or more processors, further cause the computer system to, responsive to receipt of the request, provision a software container per individual event of the subset of events; and
the executable instructions that cause the computer system to obtain the data object, process the data object, and cause the event bus to re-direct the event to the target are performed by the software container per the individual event.

19. The non-transitory computer-readable storage medium of claim 13, wherein:
the event comprises a subset of events; and
the executable instructions further comprise instructions that, as a result of being executed by the one or more processors, further cause the computer system to control a rate at which the subset of events are published to the event bus.

20. The non-transitory computer-readable storage medium of claim 13, wherein:
the executable instructions that cause the computer system to cause the event to be stored as a data object in the data store further comprise instructions that further cause the computer system to encrypt the data object, and
the executable instructions that cause the computer system to process the data object to extract the event further comprise instructions that further cause the computer system to decrypt the at least one data object.

21. The non-transitory computer-readable storage medium of claim 13, wherein:
the event comprises a subset of events; and
the executable instructions further comprise instructions that, as a result of being executed by the one or more processors, further cause the computer system to increase a rate at which the subset of events are published to the event bus from an initial rate to a maximum rate.

22. The non-transitory computer-readable storage medium of claim 13, wherein the executable instructions further comprise instructions that, as a result of being executed by the one or more processors, further cause the computer system to obtain a replay status of the event from the event bus.

\* \* \* \* \*